US011811863B2

(12) United States Patent
Shariat

(10) Patent No.: US 11,811,863 B2
(45) Date of Patent: Nov. 7, 2023

(54) METHOD AND APPARATUS FOR PROVIDING NETWORK ANALYTICS IN A WIRELESS COMMUNICATION SYSTEM

(71) Applicant: SAMSUNG ELECTRONICS CO., LTD., Suwon-si (KR)

(72) Inventor: Mehrdad Shariat, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/817,952

(22) Filed: Aug. 5, 2022

(65) Prior Publication Data

US 2023/0142427 A1    May 11, 2023

(30) Foreign Application Priority Data

Nov. 8, 2021 (GB) .................................... 2116034
Apr. 26, 2022 (GB) .................................... 2206067

(51) Int. Cl.
G06F 15/173    (2006.01)
H04L 67/1034   (2022.01)
(Continued)

(52) U.S. Cl.
CPC .......... *H04L 67/1034* (2013.01); *H04L 41/40* (2022.05); *H04W 24/10* (2013.01)

(58) Field of Classification Search
CPC ..... H04L 67/1034; H04L 41/40; H04W 24/10
See application file for complete search history.

(56) References Cited

U.S. PATENT DOCUMENTS

| 2020/0112907 | A1* | 4/2020 | Dao | ...................... H04M 15/84 |
| 2021/0306231 | A1  | 9/2021 | Lee et al. | |
| 2023/0016724 | A1* | 1/2023 | Nayak | ................... H04W 48/06 |

FOREIGN PATENT DOCUMENTS

| CN | 110831038 | A |   | 2/2020 |   |
| CN | 110912723 | A | * | 3/2020 | ......... H04L 41/0893 |

(Continued)

OTHER PUBLICATIONS

3GPP TS 23.501 V17.5.0 (Jun. 2022) Technical Specification; 3rd Generation Partnership Project; Technical Specification Group Services and System Aspects; System architecture for the 5G System (5GS); Stage 2 (Release 17); 568 pages.

(Continued)

*Primary Examiner* — Richard G Keehn

(57) ABSTRACT

The disclosure relates to a 5G or 6G communication system for supporting a higher data transmission rate. A method performed by a first network data analytics function (NWDAF) is provided. The method comprises: receiving, from a NWDAF service consumer, a first request for first analytics information, the first request including first time information on a first time duration when the first analytics information is needed for the NWDAF service consumer; transmitting, to a second NWDAF, a second request for second analytics information, the second request including second time information on a second time duration when the second analytics information is needed for the first NWDAF; receiving, from the second NWDAF, a second response including the second analytics information; and transmitting, to the NWDAF service consumer, a first response including the first analytics information generated based on second analytics information received from the at least one second NWDAF.

18 Claims, 3 Drawing Sheets

(51) Int. Cl.
  *H04L 41/40*    (2022.01)
  *H04W 24/10*    (2009.01)

(56) References Cited

FOREIGN PATENT DOCUMENTS

| CN | 111385420 A | * | 7/2020 | ............. G06N 3/084 |
|---|---|---|---|---|
| CN | 113891418 A | * | 1/2022 | |
| CN | 115942372 A | * | 4/2023 | |
| EP | 3979101 A2 | * | 4/2022 | ........... H04L 43/022 |
| GB | 2593217 A | | 9/2021 | |
| WO | WO-2021228411 A | * | 11/2021 | ............ H04W 48/17 |
| WO | WO-2022023670 A1 | * | 2/2022 | |

OTHER PUBLICATIONS

3GPP TS 23.502 V17.5.0 (Jun. 2022) Technical Specification 3rd Generation Partnership Project; Technical Specification Group Services and System Aspects; Procedures for the 5G System (5GS); Stage 2 (Release 17); 744 pages.
3GPP TS 23.288 V17.3.0 (Dec. 2021) Technical Specification; 3rd Generation Partnership Project; Technical Specification Group Services and System Aspects; Architecture enhancements for 5G System (5GS) to support network data analytics services (Release 17); 204 pages.
Samsung, "Clarification on interaction between timers and supported analytics Delay," 3GPP TSG-WG SA2 Meeting #148-E e-meeting, S2-2109077, Nov. 15 -22, 2021, Elbonia, 6 pages.
Samsung, "Clarification on interaction between timers and supported analytics Delay", Change Request, 3GPP TSG-WG SA2 Meeting #148-E, Nov. 15-22, 2021, S2-2108952, 6 pages.
"3rd Generation Partnership Project; Technical Specification Group Services and System Aspects; Study on enablers tor network automation for the 5G System (5GS); Phase 2 (Release 17)", 3GPP TR 23.700-91 V2.0.0 (Nov. 2020), 378 pages.
Ericsson, "UDM-based discovery of NWDAF in Analytics Aggregation procedure", Change Request, 3GPP TSG-SA2 Meeting #147 e-meeting, Oct. 18-22, 2021, S2-2107143, 6 pages.
Catt et al., "Update on Analytics context transfer and clarification on Termination Request", Change Request, SA WG2 Meeting #S2-147E, Oct. 18-22, 2021, S2-2107809, 12 pages.
Catt, "Update on Analytics context transfer and clarification on Termination Request", Change Request, SA WG2 Meeting #S2-147E, Oct. 18-22, 2021, S2-2107397, 12 pages.
"3rd Generation Partnership Project; Technical Specification Group Services and System Aspects; Architecture enhancements for 5G System (5GS) to support network data analytics services (Release 17)", 3GPP TS 23.288 V17.2.0 (Sep. 2021), 197 pages.
China Unicom, "Clarification on the usage of Supported Analytics Delay when the NWDAF also supports Analytics Aggregation", Change Request, SA WG2 Meeting #146e, Aug. 16-27, 2021, S2-2105870, 6 pages.
Nokia et al., "KI #2, New Solution: Distributed NWDAFs deployment and Aggregation Function", SA WG2 Meeting #140E, Aug. 19-Sep. 2, 2020, S2-2006249, 7 pages.
Combined Search and Examination Report under Section 17 and 18(3) dated Dec. 21, 2022 in connection with United Kingdom Patent Application No. GB2206067.7, 15 pages.
International Search Report dated Nov. 15, 2022 in connection with International Patent Application No. PCT/KR2022/011440, 4 pages.
Written Opinion of the International Searching Authority dated Nov. 15, 2022 in connection with International Patent Application No. PCT/KR2022/011440, 5 pages.

* cited by examiner

METHOD AND APPARATUS FOR PROVIDING NETWORK ANALYTICS IN A WIRELESS COMMUNICATION SYSTEM

CROSS-REFERENCE TO RELATED APPLICATIONS

This application is based on and claims priority under 35 U.S.C. § 119 to United Kingdom Patent Application No. 2116034.6, filed Nov. 8, 2021, and United Kingdom Patent Application No. 2206067.7, filed Apr. 26, 2022, the disclosure of which are incorporated by reference herein in their entirety.

BACKGROUND

1. Field

The present disclosure relates to the field of network analytics in a wireless communication system. In particular, the present disclosure relates to a method and apparatus for providing network analytics in a wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IMT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present disclosure is defined in the independent claims. Advantageous features are defined in the dependent claims.

According to an embodiment, a method performed by a first network data analytics function (NWDAF) in a wireless communication system is provided. The method comprises: receiving, from a NWDAF service consumer, a first request for first analytics information, the first request including first time information on a first time duration when the first analytics information is needed for the NWDAF service consumer; transmitting, to a second NWDAF, a second request for second analytics information, the second request including second time information on a second time duration when the second analytics information is needed for the first NWDAF; receiving, from the second NWDAF, a second response including the second analytics information; and transmitting, to the NWDAF service consumer, a first response including the first analytics information generated based on second analytics information received from the second NWDAF. The second time duration may expire before the first time duration.

According to an embodiment, the method may further include: in case that the second response is not received in the second time duration, receiving, from the second NWDAF, a second error response or a second error notification including a revised second time information on a revised second time duration. The revised second time duration may expire after the second time duration.

According to an embodiment, the method may further include: in case that the first response is not transmitted in the first time duration, transmitting, to the NWDAF service consumer, a first error response or a first error notification.

According to an embodiment, the first error response or the first error notification may include a revised first time information on a revised first time duration, and the revised first time duration may expire after the first time duration.

According to an embodiment, a profile of the first NWDAF in a network repository function (NRF) may be updated based on the revised first time information.

According to an embodiment, the first request may include an analytics ID.

According to an embodiment, the method may further include: identifying at least one second NWDAF based on information on a delay profile.

According to an embodiment, the information on the delay profile may include supported analytics delay per analytics ID.

According to an embodiment, the first time information may be determined based on one or more of analytics delay and a processing time related to the NWDAF.

According to an embodiment, a first network data analytics function (NWDAF) in a communications network is provided. The first network entity may comprise: a transceiver; and a controller coupled with the transceiver and configured to: receive, from a NWDAF service consumer, a first request for first analytics information, the first request including first time information on a first time duration when the first analytics information is needed for the NWDAF service consumer; transmit, to a second NWDAF, a second request for second analytics information, the second request including second time information on a second time duration when the second analytics information is needed for the first NWDAF; receive, from the second NWDAF, a second response including the second analytics information; and transmit, to the NWDAF service consumer, a first response including the first analytics information generated based on second analytics information received from the second NWDAF. The second time duration may expire before the first time duration.

According to an embodiment, the controller may be further configured to: in case that the second response is not received in the second time duration, receive, from the second NWDAF, a second error response or a second error notification including a revised second time information on a revised second time duration, wherein the revised second time duration expires after the second time duration.

According to an embodiment, the controller may be further configured to: in case that the first response is not transmitted in the first time duration, transmit, to the NWDAF service consumer, a first error response or a first error notification.

According to an embodiment, the first error response or the first error notification may include a revised first time information on a revised first time duration, and the revised first time duration may expire after the first time duration.

According to an embodiment, a profile of the first NWDAF in a network repository function (NRF) may be updated based on the revised first time information.

According to an embodiment, the first request may include an analytics ID.

According to an embodiment, the controller may be further configured to: identify at least one second NWDAF based on information on delay profile.

According to an embodiment, the information on delay profile may include supported analytics delay per analytics ID.

According to an embodiment, the first time information may be determined based on one or more of analytics delay and a processing time related to the NWDAF.

Embodiments or examples disclosed in the description and/or figures falling outside the scope of the claims are to be understood as examples useful for understanding the present disclosure.

Other aspects, advantages and salient features of the disclosure will become apparent to those skilled in the art from the following detailed description taken in conjunction with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
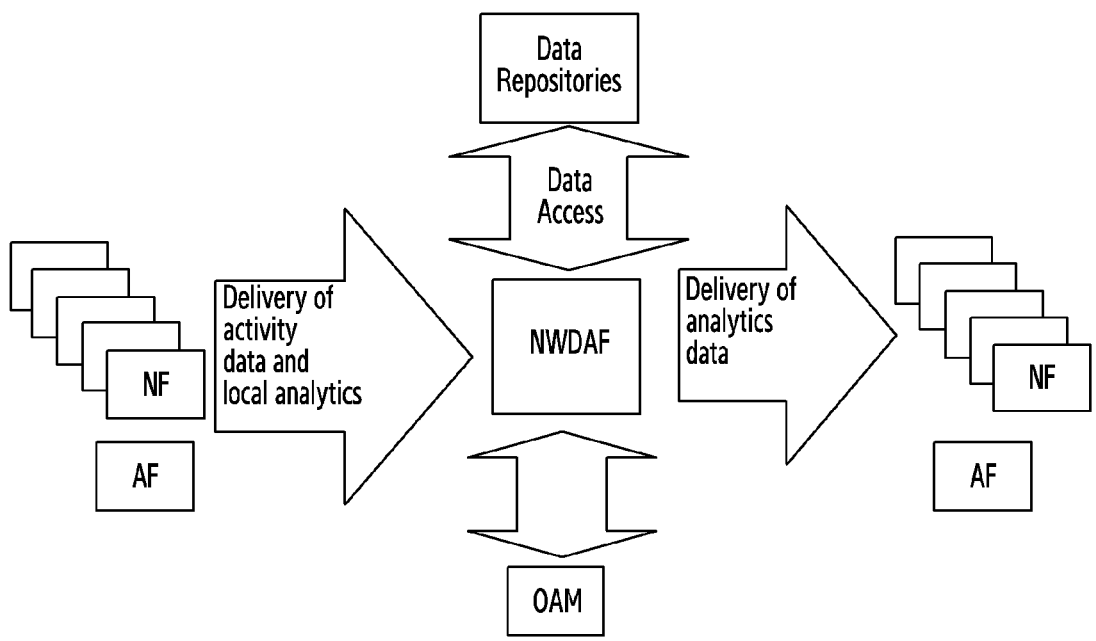
FIG. 1 illustrates a general schematic overview of various element in a 5G network automation scheme.
Figure 2:
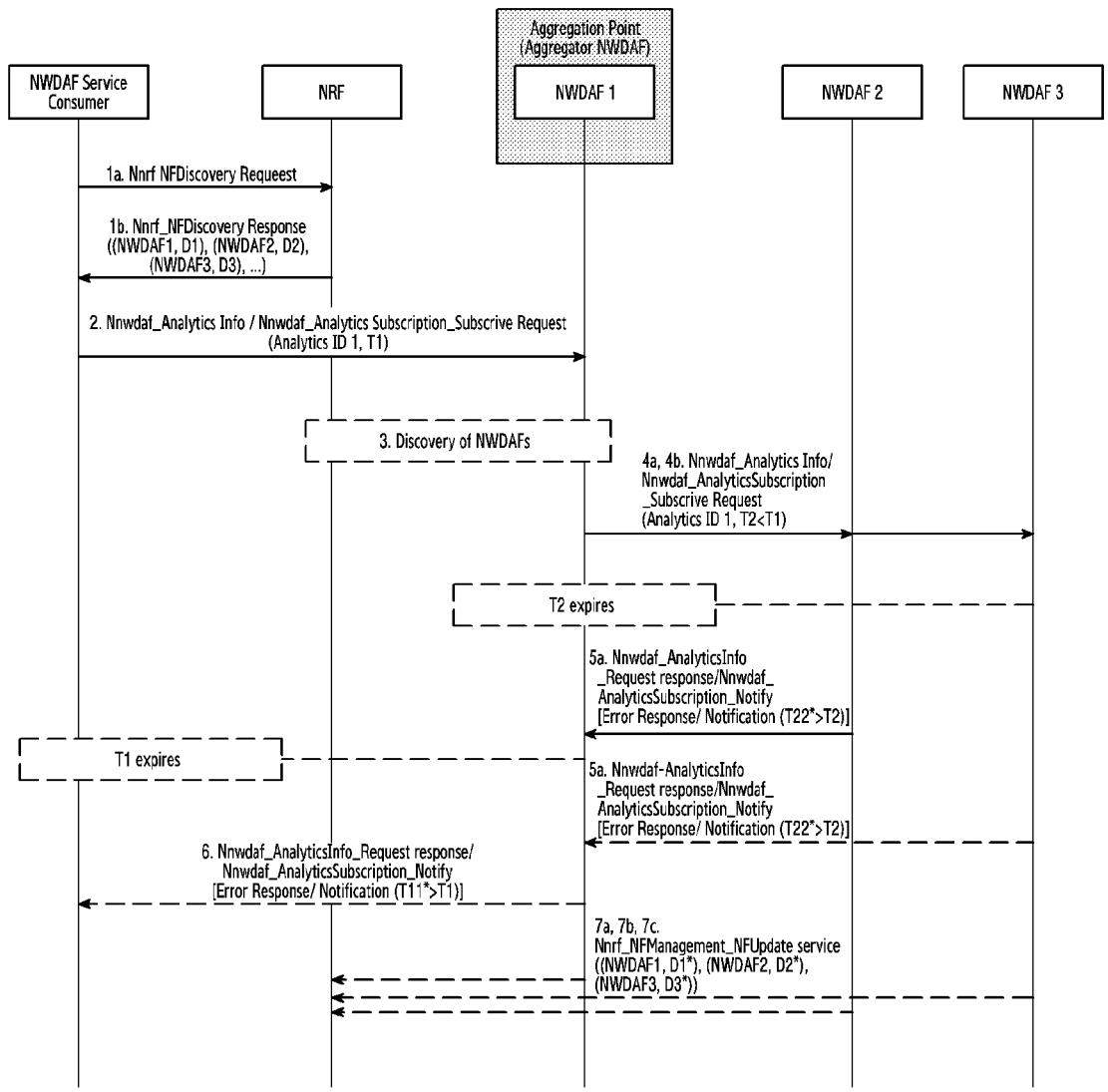
FIG. 2 illustrates a flow diagram of an example of the present disclosure for handling the timing aspects of providing network analytics.
Figure 3:
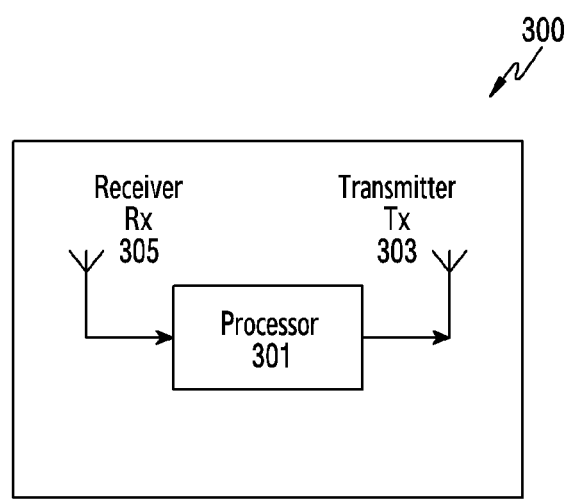
FIG. 3 illustrates a block diagram of an exemplary network entity that may be used in certain examples of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the disclosure.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the disclosure.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication.

The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Features, elements, components, integers, steps, processes, operations, functions, characteristics, properties and/or groups thereof described or disclosed in conjunction with a particular aspect, embodiment, example or claim are to be understood to be applicable to any other aspect, embodiment, example or claim described herein unless incompatible therewith.

ABBREVIATIONS/DEFINITIONS

In the present disclosure, the following acronyms/definitions are used.
3GPP 3rd Generation Partnership Project
5G 5th Generation
5GC 5G Core
5GS 5G System
ADRF Analytics Data Repository Function
AF Application Function
AMF Access and Mobility Management Function
DCCF Data Collection Coordination Function
eNA enabling Network Automation
ID Identity/Identifier
IE Information Element
MFAF Messaging Framework Adaptor Function
ML Machine Learning
NEF Network Exposure Function
NF Network Function
NRF Network Repository Function
NS Network Slice
NWDAF Network Data Analytics Function
OAM Operations, Administration and Maintenance
PCF Policy Control Function
PLMN Public Land Mobile Network
RAN Radio Access Network
SBA Service-based Architecture
SBI Service-based Interface
SMF Session Management Function
S-NSSAI Single Network Slice Selection Assistance Information
TS Technical Specification
UDM Unified Data Management
UDR Unified Data Repository
UE User Equipment
Herein, the following documents are referenced:
[1] Architecture enhancements for 5G System (5GS) to support network data analytics services, 3GPP SA2 TS23.288, Release 17
[2] System Architecture for the 5G System, 3GPP SA2 TS 23.501, Release 17
[3] Procedures for the 5G System, 3GPP SA2 TS 23.502, Release 17
Overview of NWDAF
NWDAF represents an (operator-managed) network analytics logical function providing (slice specific) network data analytics to NFs and/or AFs. A Network Slice (NS) is defined (e.g., in [2]) as a logical network that provides specific network capabilities and network characteristics. A NS may be identified by Single Network Slice Selection Assistance Information (S-NSSAI). A NF or AF may subscribe to network analytics provided by NWDAF. NWDAF collects data from NFs, AFs and/or OAM and derives network analytics. NWDAF provides suitable network analytics to subscribed NFs and/or AFs, for example based on triggering events.

The following is stated in 3GPP TS 23.501 V17.2.0, Clause 6.2.18:
The Network Data Analytics Function (NWDAF) includes one or more of the following functionalities:
Support data collection from NFs and AFs;
Support data collection from OAM;
NWDAF service registration and metadata exposure to NFs and AFs;
Support analytics information provisioning to NFs and AFs;
Support Machine Learning (ML) model training and provisioning to NWDAFs (containing Analytics logical function).
The details of the NWDAF functionality are defined in TS 23.288 [86].
The following is stated in 3GPP TS 23.288 V17.2.0, Clause 4.1:
The NWDAF (Network Data Analytics Function) is part of the architecture specified in TS 23.501 [2] and uses the mechanisms and interfaces specified for 5GC in TS 23.501 [2] and OAM services (see clause 6.2.3.1).
The NWDAF interacts with different entities for different purposes:
Data collection based on subscription to events provided by AMF, SMF, PCF, UDM, AF (directly or via NEF), and OAM;
[Optionally] Analytics and Data collection using the DCCF (Data Collection Coordination Function);
Retrieval of information from data repositories (e.g., UDR via UDM for subscriber-related information);
[Optionally] Storage and retrieval of information from ADRF (Analytics Data Repository Function);
[Optionally] Analytics and Data collection from MFAF (Messaging Framework Adaptor Function);
Retrieval of information about NFs (e.g., from NRF for NF-related information);
On demand provision of analytics to consumers, as specified in clause 6.
Provision of bulked data to consumers, as specified in clause 6.
A single instance or multiple instances of NWDAF may be deployed in a PLMN. If multiple NWDAF instances are deployed, the architecture supports deploying the NWDAF as a central NF, as a collection of distributed NFs, or as a combination of both. If multiple NWDAF instances are deployed, an NWDAF can act as an aggregate point (i.e., Aggregator NWDAF) and collect analytics information from other NWDAFs, which may have different Serving Areas, to produce the aggregated analytics (per Analytics ID), possibly with Analytics generated by itself
NOTE 1: When multiple NWDAFs exist, not all of them need to be able to provide the same type of analytics results, i.e., some of them can be specialized in providing certain types of analytics. An Analytics ID information element is used to identify the type of supported analytics that NWDAF can generate.
NOTE 2: NWDAF instance(s) can be collocated with a 5GS NF.
There is an increasing desire to improve network automation for 5G telecommunication networks, known as enabling Network Automation (eNA). 3GPP has been standardizing specifications for eNA (e.g., in [1] and also partly in [2] and [3]).

Network Data Analytics Function (NWDAF) is an integral part of eNA work specified since Release 15. NWDAF is defined as part of a Service-based Architecture (SBA) using the mechanisms and interfaces specified for 5G Core (5GC) and Operations, Administration and Maintenance (OAM).

In a service-based architecture, each network function (NF) comprises a set of services that interfaces it (as the producer of such services) to other NFs (as the consumer of those services) over a common bus known as service-based interface (SBI).

FIG. 1 shows a general schematic overview illustrating various elements in a 5G network automation scheme. Only those parts relevant to the automation are shown, for clarity. As illustrated, activity data and analytics are provided from a first group of NFs or Application Functions (AFs) to the NWDAF. The NWDAF also interfaces to the OAM and data repositories. The NWDAF analyses the input data from these sources and delivers output analytics to a second group of NFs or AFs. The second group of NFs may include some or all of the first group of NFs or AFs. The output analytics can be used by different consumer NFs to assist them in their respective operations.

Each family of use cases for analytics and predictions from the NWDAF has its distinct analytics type, identified by a certain analytics ID. A consumer NF indicates the required analytics ID as part of the request or subscription to the NWDAF along with other input elements, for example target of analytics reporting (e.g., a single UE, group of UEs or any UE), analytics filters (e.g., area of interest) or granularity of information required.

In certain applications, the timing of providing/receiving analytics may be important. Accordingly, what is desired is a technique for handling the timing aspects of providing network analytics, including in applications in which network analytics are aggregated.

The above information is presented as background information only to assist with an understanding of the present disclosure. No determination has been made, and no assertion is made, as to whether any of the above might be applicable as prior art with regard to the present disclosure.

Certain examples of the present disclosure provide methods, apparatus, and systems for handling the timing aspects of providing network analytics. For example, certain examples of the present disclosure provide methods, apparatus, and systems for handling the timing aspects of providing aggregated NWDAF data analytics in a 3GPP 5G network. However, the skilled person will appreciate that the present disclosure is not limited to these examples, and may be applied in any suitable system or standard, for example one or more existing and/or future generation wireless communication systems or standards, including any existing or future releases of the same standards specification, for example 3GPP 5G.

The following examples are applicable to, and use terminology associated with, 3GPP 5G. However, the skilled person will appreciate that the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function, or purpose within the network. For example, the functionality of the NWDAF in the examples below may be applied to any other suitable type of entity providing network analytics; and the functionality of the NRF in the examples below may be applied to any other suitable type of entity performing network repository functions.

A particular network entity may be implemented as a network element on a dedicated hardware, as a software instance running on a dedicated hardware, and/or as a virtualised function instantiated on an appropriate platform, e.g., on a cloud infrastructure.

The skilled person will appreciate that the present disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes, or operations.

One or more of the messages in the examples disclosed herein may be replaced with one or more alternative messages, signals or other type of information carriers that communicate equivalent or corresponding information.

The transmission of information between network entities is not limited to the specific form or type of messages of the examples disclosed herein.

One or more further entities and/or messages may be added to the examples disclosed herein.

One or more non-essential entities and/or messages may be omitted in certain examples.

The functions, processes, or operations of a particular entity in one example may be divided between two or more separate entities in an alternative example.

The functions, processes, or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system (e.g., network or wireless communication system) comprising one or more such apparatuses/devices/network entities, and/or a method therefor.

The procedures disclosed herein refer to various network functions/entities. Detailed descriptions of known functions/entities are omitted for conciseness. The skilled person will appreciate that certain functions/entities and their definitions are disclosed in various standards documents. For example, the following functions/entities are defined in at least 3GPP TS 23.288, TS 23.501, and TS 23.502:

Network Data Analytic Function (NWDAF)
Operations, Administration and Maintenance (OAM)
User Equipment (UE)
Radio Access Network (RAN)
Network Repository Function (NRF)

FIG. 1 illustrates a schematic overview of a first example of the present disclosure illustrating an exemplary procedure for collecting relative proximity information.

As noted above, in certain applications, the timing of providing/receiving analytics may be important.

Certain examples of the present disclosure provide one or more techniques for handling the timing aspects of providing network analytics, including in applications in which network analytics are aggregated.

Certain examples provide one or more techniques for acquisition, processing and use of timers when aggregating analytics in a network (e.g., 5G network).

Certain examples provide one or more techniques for enhancing the interaction and coordination between multiple timers when aggregating analytics from multiple NWDAFs.

In certain examples, an NWDAF may register (e.g., via NRF) information (e.g., "Supported Analytics Delay per Analytics ID") relating to a delay associated with providing network analytics of a certain type (e.g., defined by an analytics ID). Such information may form at least a part of a delay profile.

In certain examples, an aggregator NWDAF may register (e.g., via NRF) information (e.g., "Aggregated Supported Analytics Delay per Analytics ID") relating to a delay associated with aggregation of network analytics of a certain type (e.g., defined by an analytics ID). Such information may additionally or alternatively form at least part of the delay profile.

An NWDAF service consumer may use information of a delay profile, for example, when selecting NWDAF candidates in consideration of certain timing requirements of the NWDAF service consumer (e.g., "time when analytics information is needed").

In certain examples, in the case that a plurality of NWDAFs are provided (e.g., via the NRF) as aggregation point (e.g., aggregator NWDAF) candidates in the network, the NWDAF service consumer may consider candidates with delay profiles (e.g., "Supported Analytics Delay per Analytics ID") that are a match for certain timing requirements (e.g., "time when analytics information is needed"). This may be in addition to the aggregation capability and other capabilities registered in the NRF to select the aggregation points. For example, only candidates with "Supported Analytics Delay" below "time when analytics information is needed" may be considered.

In certain examples, an aggregator NWDAF may register a separate Information Element (IE) in the NRF as "aggregated supported Analytics Delay per analytics ID" in addition to its own "Supported Analytics Delay per analytics ID" in order to indicate or differentiate Supported Analytics Delay in case of aggregation from other NWDAFs.

In certain examples, an aggregator NWDAF, for example based on queries to the NRF, may determine or select one or more NWDAFs to aggregate analytics from, in consideration of information of their delay profiles, for example in consideration of their "Supported Analytics Delay per Analytics ID", possibly in addition to other selection criteria.

In certain examples, a network entity may specify a time by which analytics information is needed. For example, this may be achieved using a certain timer (e.g., "time when analytics information is needed" timer), which may be set to an appropriate value such that the timer expires at the time the analytics is needed. For example: a consumer NF may specify a time by which network analytics from an NWDAF is needed; a consumer NF may specify a time by which aggregated network analytics from an NWDAF aggregator is needed; and/or an NWDAF aggregator may specify a time by which analytics from an NWDAF is needed (for the purpose of aggregation). A separate timer may be provided for each case.

An NWDAF aggregator needs to receive analytics from one or more NWDAFs before providing the aggregated analytics to a consumer NF. Accordingly, in certain examples, the time specified by the consumer NF by which aggregated network analytics from the NWDAF aggregator is needed should be later than the time(s) specified by the NWDAF aggregator by which the analytics from the NWDAF(s) is needed.

In certain examples, if an NWDAF or NWDAF aggregator cannot provide analytics or aggregated analytics by a time requested by a network entity (e.g., consumer NF or NWDAF aggregator), the NWDAF or NWDAF aggregator may transmit a message (e.g., error message) to the requesting entity indicating that analytics cannot be provided by the requested time. In certain examples, the message may include an expected or updated time for providing the requested analytics or aggregated analytics.

In certain examples, if an NWDAF aggregator receives an error message from one or more NWDAF such that the NWDAF aggregator cannot provide aggregated analytics to a consumer NR by a requested time, then the NWDAF aggregator may transmit a message (e.g., error message) to the consumer NF indicating that aggregated analytics cannot be provided by the requested time. In certain examples, the message may include an expected or updated time for providing the requested aggregated analytics. The expected or updated time in the message to the consumer NF may be determined based on the expected or updated time(s) in message(s) received from the NWDAF(s) (e.g., the former is set to be later than the latter with a difference sufficient to allow for the aggregation process).

In certain examples, if the timer "time when analytics information is needed" is reached at the aggregator NWDAF or if any of the determined NWDAFs send an error response or notification to the aggregator NWDAF before the timer expires (reflecting the analytics is not ready), the aggregator NWDAF may indicate a "revised waiting time" in an error response or error notification to the NWDAF service consumer.

In certain examples, the "revised waiting time" from the aggregator NWDAF to the NWDAF service consumer may be determined based on the revised waiting time indicated from the determined NWDAFs to the aggregator NWDAF (e.g., as part of the error response or notification) in addition to any other analytics delay and processing time expected at the aggregator NWDAF. For example, the maximum of "revised waiting time" from other NWDAFs, the sum of "revised waiting time" from other NWDAFs or any other similar criteria could be adopted.

In certain examples, the determined NWDAFs may update their "Supported Analytics Delay per Analytics ID" in the NRF based on the revised waiting time indicated to the aggregator NWDAF. This may be used for the NWDAF discovery in future analytics requests/subscriptions.

In certain examples, the aggregator NWDAF may either update its own "Supported Analytics Delay per Analytics ID" or "aggregated supported Analytics Delay per analytics ID" in the NRF based on the revised waiting time indicated to the service consumer NF. This may be used for the aggregator NWDAF discovery in future analytics requests/subscriptions.

The skilled person will appreciate that the techniques described above, as well as other techniques disclosed in the present application, may be used in any suitable combination. The skilled person will also appreciate that the techniques described above, as well as other techniques disclosed in the present application, may be used independently. For example, the following techniques according to the present disclosure may be used independently or in any combination.

A technique of registering, by an NWDAF and/or aggregator NWDAF, delay profile information (e.g., using NRF or any other suitable technique).

A technique of discovering one or more NWDAFs and/or NWDAF aggregators (e.g., using NRF or any other suitable technique).

A technique of selecting one or more NWDAFs and/or NWDAFs aggregator based on delay profile information and/or timing requirements (possibly in addition to one or more further criteria).

A technique of using one or more timers for indicating a time when analytics and/or aggregated analytics is needed.

A technique of indicating that requested analytics and/or aggregated analytics cannot be provided by a requested time.

A technique of indicating a new or updated time that requested analytics and/or aggregated analytics can be provided.

FIG. 2 illustrates a flow diagram of an example of the present disclosure for handling the timing aspects of providing network analytics. The skilled person will appreciate that the present disclosure is not limited to the example of FIG. 2. For example, various operations of the example of FIG. 2 may be omitted in alternative examples if certain techniques used in combination in FIG. 2 are instead to be used independently.

In operations 1a-b, the NWDAF service consumer discovers the NWDAF via the NRF. The NRF may return multiple NWDAF candidates matching the requested capabilities, and supported Analytics ID(s). The NRF may also return "Supported Analytics Delay per analytics ID" and/or "aggregated supported Analytics Delay per analytics ID". The NWDAF service consumer selects an NWDAF (e.g., NWDAF 1) with analytics aggregation capability (i.e., aggregator NWDAF), based on its internal selection criteria, possibly considering registered NWDAF capabilities, "Supported Analytics Delay per Analytics ID", "aggregated supported Analytics Delay per analytics ID" and other information in NRF. As an example only, candidates with "Supported Analytics Delay" or "aggregated supported Analytics Delay per analytics ID" below "time when analytics information is needed" may be selected.

In operation 2, the NWDAF service consumer requests or subscribes to analytics from the selected aggregator NWDAF (e.g., NWDAF 1). For example, this may be done by invoking Nnwdaf_AnalyticsInfo_Request or Nnwdaf_AnalyticsSubscription_Subscribe service operation. The request may include "time when analytics information is needed" (e.g., T1), and information defining an analytics type, which may be an Analytics ID (e.g., Analytics ID 1). In certain examples, the request may include other relevant information, for example information defining the target for analytics and/or information defining one or more analytics filters. The target for analytics reporting may be, for example, a single UE, group of UEs, or any UE. The NWDAF Service Consumer may request statistics or predictions or both. These may be requested for a given time window.

In operation 3, on receiving the request in operation 2, the Aggregator NWDAF (e.g., NWDAF 1) determines the other NWDAF instances that collectively can cover the requested information from the NWDAF service consumer. For example, this may be done based on configuration or queries to the NRF, and may be done considering the request from the NWDAF service consumer. The Aggregator NWDAF may also consider "Supported Analytics Delay per Analytics ID" per NWDAF in addition to other selection criteria.

In operations 4a-4b, the Aggregator NWDAF (e.g., NWDAF 1) requests or subscribes to service operation from each of the NWDAFs discovered/determined in operation 3 (e.g., NWDAF 2 and NWDAF 3). For example, this may be done by invoking Nnwdaf_AnalyticsInfo_Request or Nnwdaf_AnalyticsSubscription_Subscribe. Aggregator NWDAF may also provide "time when analytics information is needed" (e.g., T2). In certain examples, T2 may be set to be smaller than T1, accounting for the analytics delay and processing time within the aggregator NWDAF itself.

In operations 5a-5b, if the determined NWDAFs (e.g., NWDAF 2 and/or NWDAF 3) cannot reply or notify with the requested output analytics before the expiry of T2, they may send an error response or error notification to the aggregator NWDAF. In certain examples, this may include a "revised waiting time" (e.g., T22* from NWDAF2 and/or T23* from NWDAF 3). In certain examples, T22* or T23* may be set to be greater than the T2.

In operation 6, if the aggregator NWDAF (e.g., NWDAF 1) cannot reply or notify with the requested output analytics before the expiry of T1 or anticipates that it cannot reply or notify with the requested output analytics before the expiry of T1 (e.g., due to step 5a-5b), it may send an error response or error notification to the NWDAF service consumer. In certain examples, this may include a "revised waiting time" (e.g., T11* from NWDAF1). In certain examples, T11* may be set to be greater than T1. In certain examples, T11* may be set based on the maximum of T22* or T23*, or the sum of T22* and T23*, or any other suitable criteria, for example depending on the deployment topology of the NWDAFs.

In certain examples, operation 6 may occur immediately after operations 5a-5b, either before, during, or after T1 expiry.

In operations 7a-7b, the determined NWDAFs (e.g., NWDAF 2 and/or NWDAF 3) may update "Supported Analytics Delay per Analytics ID" (e.g., D2*, D3*) within the corresponding NRF profiles for future based on revised waiting times indicated in operation 5a-5b (i.e., T22* and T23*).

In operation 7c, the Aggregator NWDAF (e.g., NWDAF 1) may update "Supported Analytics Delay per Analytics ID" or "aggregated supported Analytics Delay per analytics ID" (e.g., D1*) within the corresponding NRF profile for future based on revised waiting time indicated in operation 6 (i.e., T11*).

Certain examples of the present disclosure provide a first network entity (e.g., NRF, NWDAF, NWDAF aggregator or NWDAF Service Consumer) configured to operate according to a method of any aspect, example, embodiment and/or claim disclosed herein.

Certain examples of the present disclosure provide a second network entity (e.g., NRF, NWDAF, NWDAF aggregator or NWDAF Service Consumer) configured to cooperate with a first network entity of the preceding example according to a method of any aspect, example, embodiment and/or claim disclosed herein.

Certain examples of the present disclosure provide a network (or wireless communication system) comprising one or more network entities (e.g., first and/or second network entities) according to the preceding examples.

Certain examples of the present disclosure provide a computer program comprising instructions which, when the program is executed by a computer or processor, cause the computer or processor to carry out a method according to any aspect, example, embodiment and/or claim disclosed herein.

Certain examples of the present disclosure provide a computer or processor-readable data carrier having stored thereon a computer program according to the preceding example.

FIG. 3 illustrates a block diagram of an exemplary network entity that may be used in examples of the present disclosure, such as the techniques disclosed in relation to FIG. 1 and/or FIG. 2. For example, the Consumer NF (NWDAF Service Consumer), NWDAF, NWDAF aggregator, NRF, and/or other NFs may be provided in the form of the network entity illustrated in FIG. 3. The skilled person will appreciate that a network entity may be implemented, for example, as a network element on a dedicated hardware, as a software instance running on a dedicated hardware, and/or as a virtualised function instantiated on an appropriate platform, e.g., on a cloud infrastructure.

The entity 300 comprises a processor (or controller) 301, a transmitter 303 and a receiver 305. The receiver 305 is configured for receiving one or more messages from one or more other network entities, for example as described above. The transmitter 303 is configured for transmitting one or more messages to one or more other network entities, for example as described above. The processor 301 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device, or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

According to an embodiment, a method performed by a first network data analytics function (NWDAF) in a wireless communication system is provided. The method comprises: receiving, from a NWDAF service consumer, a first request for first analytics information, the first request including first time information on a first time duration when the first analytics information is needed for the NWDAF service consumer; transmitting, to a second NWDAF, a second request for second analytics information, the second request including second time information on a second time duration when the second analytics information is needed for the first NWDAF; receiving, from the second NWDAF, a second response including the second analytics information; and transmitting, to the NWDAF service consumer, a first response including the first analytics information generated based on second analytics information received from the second NWDAF. The second time duration may expire before the first time duration.

According to an embodiment, the method may further include: in case that the second response is not received in the second time duration, receiving, from the second NWDAF, a second error response or a second error notification including a revised second time information on a revised second time duration. The revised second time duration may expire after the second time duration.

According to an embodiment, the method may further include: in case that the first response is not transmitted in the first time duration, transmitting, to the NWDAF service consumer, a first error response or a first error notification.

According to an embodiment, the first error response or the first error notification may include a revised first time information on a revised first time duration, and the revised first time duration may expire after the first time duration.

According to an embodiment, a profile of the first NWDAF in a network repository function (NRF) may be updated based on the revised first time information.

According to an embodiment, the first request may include an analytics ID.

According to an embodiment, the method may further include: identifying at least one second NWDAF based on information on delay profile.

According to an embodiment, the information on delay profile may include supported analytics delay per analytics ID.

According to an embodiment, the first time information may be determined based on one or more of analytics delay and a processing time related to the NWDAF.

According to an embodiment, a first network data analytics function (NWDAF) in a communications network is provided. The first network entity may comprise: a transceiver; and a controller coupled with the transceiver and configured to: receive, from a NWDAF service consumer, a first request for first analytics information, the first request including first time information on a first time duration when the first analytics information is needed for the NWDAF service consumer; transmit, to a second NWDAF, a second request for second analytics information, the second request including second time information on a second time duration when the second analytics information is needed for the first NWDAF; receive, from the second NWDAF, a second response including the second analytics information; and transmit, to the NWDAF service consumer, a first response including the first analytics information generated based on second analytics information received from the second NWDAF. The second time duration may expire before the first time duration.

According to an embodiment, the controller may be further configured to: in case that the second response is not received in the second time duration, receive, from the second NWDAF, a second error response or a second error notification including a revised second time information on a revised second time duration, wherein the revised second time duration expires after the second time duration.

According to an embodiment, the controller may be further configured to: in case that the first response is not transmitted in the first time duration, transmit, to the NWDAF service consumer, a first error response or a first error notification.

According to an embodiment, the first error response or the first error notification may include a revised first time information on a revised first time duration, and the revised first time duration may expire after the first time duration.

According to an embodiment, a profile of the first NWDAF in a network repository function (NRF) may be updated based on the revised first time information.

According to an embodiment, the first request may include an analytics ID.

According to an embodiment, the controller may be further configured to: identify at least one second NWDAF based on information on delay profile.

According to an embodiment, the information on delay profile may include supported analytics delay per analytics ID.

According to an embodiment, the first time information may be determined based on one or more of analytics delay and a processing time related to the NWDAF.

According to an aspect of the present disclosure, there is provided a first network entity included in a communications network, the first network entity comprising: a transmitter; a receiver; and a controller configured to: receive, from a second network entity included in the communications network, a first request for analytics information, the first request including an indication of a first time; transmit, to at least one third network entity included in the communications network, a second request for analytics information based on the first request, the second request including an indication of a second time based on the indication of the first time being included in the first request; and receive, from a third network entity from among the at least one third network entity, a first response to the second request.

According to certain embodiments, the second time is a smaller value than the first time.

According to certain embodiments, the first response includes an indication of a third time from the third network entity to the first network entity, the third time being a larger value than the second time.

According to certain embodiments, the second time expires earlier than the first time and/or the third time expires later than the second time.

According to certain embodiments, the first response is an error response or error notification from the third network entity to the first network entity indicating that the third network entity cannot respond with analytics information indicated in the second request before the expiration of the second time.

According to certain embodiments, the processor is configured to: if the first network entity cannot respond to the second network entity with the analytics information before expiration of the first time or if it is determined or anticipated, by the first network entity based on the first response from the third network entity, that the first network entity will be unable to respond to the second network entity with the analytics information before expiration of the first time, transmit a second response to the second network entity.

According to certain embodiments, the second response includes an indication of a fourth time from the first network entity to the second network entity.

According to certain embodiments, the fourth time is determined, by the first network entity, based on the third time.

According to certain embodiments, the second response from the first network entity is an error response or error notification indicating that the first network entity cannot respond with the analytics information of the first request before expiration of the first time.

According to certain embodiments, one or more of: the first time is a time when the analytics information is needed by the second network entity; the second time is a time when the analytics information is needed by the first network entity; the third time is a revised waiting time from the third network entity; and the fourth time is a revised waiting time from the first network entity.

According to certain embodiments, a profile of the first network entity in a network repository function (NRF) is updated based on the fourth time.

According to certain embodiments, the second time is determined based on one or more of an analytics delay and a processing time related to the first network entity.

According to certain embodiments, the first request includes analytics ID corresponding to the analytics information of the first request; wherein the controller is configured to determine, in response to the first request, the at least one third network entity to be able to cover the requested analytics information based on the analytics ID.

According to certain embodiments, the controller is configured to determine the at least one third network entity based on information on a delay profile for the at least one third network entity.

According to certain embodiments, the controller is configured to determine the at least one third network entity based on configuration or queries with a network repository function (NRF).

According to certain embodiments, the first network entity is an aggregator network data analytics function (NWDAF), the second network entity is a NWDAF service consumer, and the at least one third network entity is at least one NWDAF; and wherein the communications network is a 5G network.

According to another aspect of the present disclosure, there is provided a second network entity included in a communications network, the second network entity comprising: a transmitter; a receiver; and a controller configured to: identify a first network entity included in the communications network based on a first time relating to analytics information and information on a delay profile of the first network entity; and transmit, to the first network entity, a request for the analytics information, the request including an indication of the first time.

According to certain embodiments, the controller is configured to: discover, via a network repository function (NRF), a plurality of candidate network entities including the first network entity, wherein the plurality of candidate network entities match requested capabilities and a supported analytics ID; and wherein the first network entity is identified from among the plurality of candidate network entities.

According to certain embodiments, the controller is configured to identify the first network entity from among the plurality of candidate network entities based on a supported analytics delay of the first network entity being less than the first time, wherein the supported analytics delay is included in the information on the delay profile of the first network entity.

According to certain embodiments, the supported analytics delay is associated with providing network analytics corresponding to the analytics ID, and wherein the request for the analytics information is a request for network analytics corresponding to the analytics ID.

According to certain embodiments, the controller is configured to: receive, from the first network entity, a response including an indication of a fourth time.

According to certain embodiments, the response is an error response or error notification indicating that the first network entity cannot respond with the requested analytics information before expiration of the first time.

According to certain embodiments, the fourth time is a larger value than the first time such that the fourth time expires later than the first time.

According to certain embodiments, one or more of: the first time is a time when the analytics information is needed by the second network entity; and the fourth time is a revised waiting time from the first network entity.

According to another aspect of the present disclosure, there is provided a third network entity in a communications network, the third network entity comprising: a transmitter; a receiver; and a controller configured to: receive, from a first network entity included in the communications network, a request for analytics information, wherein the request includes an indication of a second time, and wherein the analytics information is requested by a second network entity in the communications network; and if the third network entity cannot respond with the requested analytics information before the expiration of the second time, transmit, to the first network entity, a response to the request.

According to certain embodiments, the response includes an indication of a third time.

According to certain embodiments, the response is an error response or error notification indicating that the third network entity cannot respond with the requested analytics information before the expiration of the third time.

According to certain embodiments, one or more of: the second time is a time when the analytics information is needed by the first network entity; the third time is a revised waiting time from the third network entity.

According to another aspect of the present disclosure, there is provided a system comprising two or more of a first network entity according to any of the aspect or embodiments recited above, a second network entity according to any of the aspect or embodiments recited above, and a third network entity according to any of the aspect or embodiments recited above.

According to another aspect of the present disclosure, there is provided a method of a first network entity in a communications network, the method comprising: receiving, from a second network entity included in the communications network, a first request for analytics information, the first request including an indication of a first time; transmitting, to at least one third network entity included in the communications network, a second request for the analytics information, the second request including an indication of a second time based on the indication of the first time being included in the first request; and receiving, from a third network entity from among the at least one third network entity, a first response to the second request.

According to certain embodiments, the second time is a smaller value than the first time.

According to certain embodiments, the first response includes an indication of a third time from the third network entity to the first network entity, the third time being a larger value than the second time.

According to certain embodiments, the second time expires earlier than the first time and/or the third time expires later than the second time.

According to certain embodiments, the first response is an error response or error notification from the third network entity to the first network entity indicating that the third network entity cannot respond with analytics information indicated in the second request before the expiration of the second time.

According to certain embodiments, the method further comprises: if the first network entity cannot respond to the second network entity with the analytics information before expiration of the first time or if it is determined or anticipated, by the first network entity based on the first response from the third network entity, that the first network entity will be unable to respond to the second network entity with the analytics information before expiration of the first time, transmitting a second response to the second network entity.

According to certain embodiments, the second response includes an indication of a fourth time from the first network entity to the second network entity.

According to certain embodiments, the fourth time is determined, by the first network entity, based on the third time.

According to certain embodiments, the second response from the first network entity is an error response or error notification indicating that the first network entity cannot respond with the analytics information of the first request before expiration of the first time.

According to certain embodiments, one or more of: the first time is a time when the analytics information is needed by the second network entity; the second time is a time when the analytics information is needed by the first network entity; the third time is a revised waiting time from the third network entity; and the fourth time is a revised waiting time from the first network entity.

According to certain embodiments, a profile of the first network entity in a network repository function (NRF) is updated based on the fourth time.

According to certain embodiments, the second time is determined based on one or more of an analytics delay and a processing time related to the first network entity.

According to certain embodiments, the first request includes analytics ID corresponding to the analytics information of the first request; wherein the method further comprises: determining, in response to the first request, the at least one third network entity to be able to cover the requested analytics information based on the analytics ID.

According to certain embodiments, the method further comprises: determining the at least one third network entity based on information on a delay profile for the at least one third network entity.

According to certain embodiments, the method further comprises: determining the at least one third network entity based on configuration or queries with a network repository function (NRF).

According to certain embodiments, the first network entity is an aggregator network data analytics function (NWDAF), the second network entity is a NWDAF service consumer, and the at least one third network entity is at least one NWDAF; and wherein the communications network is a 5G network.

According to another aspect of the present disclosure, there is provided a method of a second network entity in a communications network, the method comprising: identifying a first network entity included in the communications network based on a first time relating to analytics information and information on a delay profile of the first network entity; and transmitting, to the first network entity, a request for the analytics information, the request including an indication of the first time.

According to certain embodiments, the method further comprises: discovering, via a network repository function (NRF), a plurality of candidate network entities including the first network entity, wherein the plurality of candidate network entities match requested capabilities and a supported analytics ID; and wherein the first network entity is identified from among the plurality of candidate network entities.

According to certain embodiments, the method further comprises: identifying the first network entity from among the plurality of candidate network entities based on a supported analytics delay of the first network entity being less than the first time, wherein the supported analytics delay is included in the information on the delay profile of the first network entity.

According to certain embodiments, the supported analytics delay is associated with providing network analytics corresponding to the analytics ID, and wherein the request for the analytics information is a request for network analytics corresponding to the analytics ID.

According to certain embodiments, the method further comprises: receiving, from the first network entity, a response including an indication of a fourth time.

According to certain embodiments, the response is an error response or error notification indicating that the first network entity cannot respond with the requested analytics information before expiration of the first time.

According to certain embodiments, the fourth time is a larger value than the first time such that the fourth time expires later than the first time.

According to certain embodiments, wherein one or more of: the first time is a time when the analytics information is needed by the second network entity; and the fourth time is a revised waiting time from the first network entity.

According to another aspect of the present disclosure, there is provided a method of a third network entity in a communications network, the method comprising: receiving, from a first network entity included in the communications network, a request for analytics information, wherein the request includes an indication of a second time, and wherein the analytics information is requested by a second network entity in the communications network; and if the third network entity cannot respond with the requested analytics information before the expiration of the second time, transmitting, to the first network entity, a response to the request.

According to certain embodiments, the response includes an indication of a third time.

According to certain embodiments, the response is an error response or error notification indicating that the third network entity cannot respond with the requested analytics information before the expiration of the third time.

According to certain embodiments, one or more of: the second time is a time when the analytics information is needed by the first network entity; and the third time is a revised waiting time from the third network entity.

Advantageously, certain examples of the present disclosure allow for selection of an aggregator NWDAF which may be able to provide analytics information within a time as needed by an NWDAF service consumer.

Advantageously, certain examples of the present disclosure allow for determination of one or more NWDAFs capable of providing analytics information within a time as needed by an aggregator NWDAF.

Advantageously, certain examples of the present disclosure allow for an aggregator NWDAF and/or a NWDAF service consumer to be informed of a revised time by which analytics information may be provided.

Advantageously, certain examples of the present disclosure allow for communication of timings between network entities, in relation to requesting and/or providing analytics information.

While the disclosure has been shown and described with reference to certain examples, it will be understood by those skilled in the art that various changes in form and detail may be made therein without departing from the scope of the disclosure, as defined by the appended claims.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims. Also, the embodiments may be combined with each other as required. For example, a base station and a terminal may operate with some of the methods proposed in the present disclosure combined together. Also, the embodiments are proposed based on a 5G or NR system, but other modifications based on technical ideas of the embodiments may be implemented on other systems, such as an LTE, LTE-A, LTE-A-Pro, NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first network data analytics function (NWDAF) in a wireless communication system, the method comprising:

receiving, from a NWDAF service consumer, a first request for first analytics information, the first request including first time information on a first time duration when the first analytics information is needed for the NWDAF service consumer;

transmitting, to a second NWDAF, a second request for second analytics information, the second request including second time information on a second time duration when the second analytics information is needed for the first NWDAF;

receiving, from the second NWDAF, a second response including the second analytics information; and transmitting, to the NWDAF service consumer, a first response including the first analytics information generated based on second analytics information received from the second NWDAF, wherein the first NWDAF is an aggregator NWDAF, and wherein the second time duration expires before the first time duration.

2. The method of claim 1, further comprising:

in case that the second response is not received in the second time duration, receiving, from the second NWDAF, a second error response or a second error notification including a revised second time information on a revised second time duration, wherein the revised second time duration expires after the second time duration.

3. The method of claim 1, further comprising:

in case that the first response is not transmitted in the first time duration, transmitting, to the NWDAF service consumer, a first error response or a first error notification.

4. The method of claim 3, wherein the first error response or the first error notification includes a revised first time information on a revised first time duration, and wherein the revised first time duration expires after the first time duration.

5. The method of claim 4, wherein a profile of the first NWDAF in a network repository function (NRF) is updated based on the revised first time information.

6. The method of claim 1, wherein the first request includes an analytics identifier (ID).

7. The method of claim 1, further comprising:

identifying at least one second NWDAF based on information on a delay profile.

8. The method of claim 7, wherein the information on the delay profile includes supported analytics delay per analytics identifier (ID).

9. The method of claim 1, wherein the first time information is determined based on one or more of analytics delay and a processing time related to the NWDAF.

10. A first network data analytics function (NWDAF) in a communications network, the first NWDAF comprising:

a transceiver; and a controller coupled with the transceiver and configured to:

receive, from a NWDAF service consumer, a first request for first analytics information, the first request including first time information on a first time duration when the first analytics information is needed for the NWDAF service consumer;

transmit, to a second NWDAF, a second request for second analytics information, the second request including second time information on a second time duration when the second analytics information is needed for the first NWDAF;

receive, from the second NWDAF, a second response including the second analytics information; and transmit, to the NWDAF service consumer, a first response including the first analytics information generated based on second analytics information received from the second NWDAF, wherein the first NWDAF is an aggregator NWDAF, and wherein the second time duration expires before the first time duration.

11. The NWDAF of claim 10, wherein the controller is further configured to:

in case that the second response is not received in the second time duration, receive, from the second NWDAF, a second error response or a second error notification including a revised second time information on a revised second time duration, wherein the revised second time duration expires after the second time duration.

12. The NWDAF of claim 10, wherein the controller is further configured to:

in case that the first response is not transmitted in the first time duration, transmit, to the NWDAF service consumer, a first error response or a first error notification.

13. The NWDAF of claim 12, wherein the first error response or the first error notification includes a revised first time information on a revised first time duration, and wherein the revised first time duration expires after the first time duration.

14. The NWDAF of claim 13, wherein a profile of the first NWDAF in a network repository function (NRF) is updated based on the revised first time information.

15. The NWDAF of claim 10, wherein the first request includes an analytics identifier (ID).

16. The NWDAF of claim 10, wherein the controller is further configured to:

identify at least one second NWDAF based on information on delay profile.

17. The NWDAF of claim 16, wherein the information on delay profile includes supported analytics delay per analytics identifier (ID).

18. The NWDAF of claim 10, wherein the first time information is determined based on one or more of analytics delay and a processing time related to the NWDAF.

* * * * *